Figure 1:
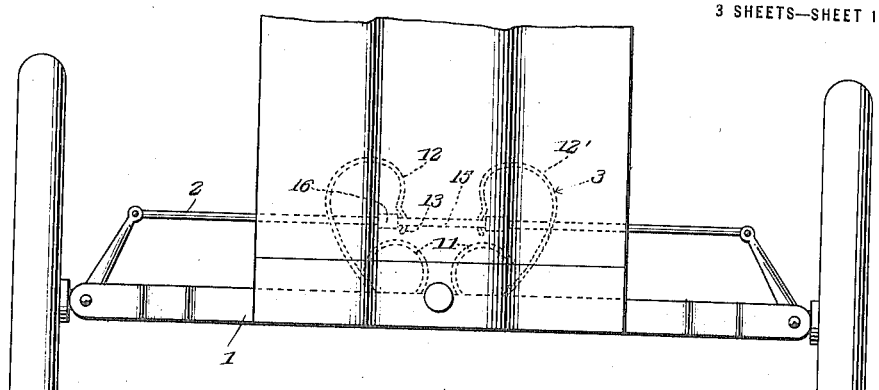

W. W. HUNT.
STEERING DEVICE.
APPLICATION FILED FEB. 16, 1915.

1,164,522.

Patented Dec. 14, 1915.
3 SHEETS—SHEET 1.

Witnesses

Inventor
W. W. Hunt,
By Victor J. Evans
Attorney

W. W. HUNT.
STEERING DEVICE.
APPLICATION FILED FEB. 16, 1915.
1,164,522.
Patented Dec. 14, 1915.
3 SHEETS—SHEET 3.
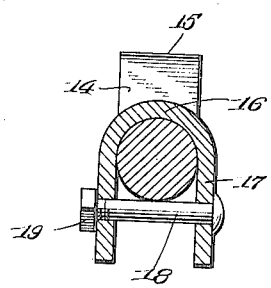
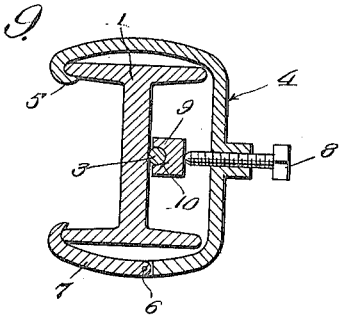
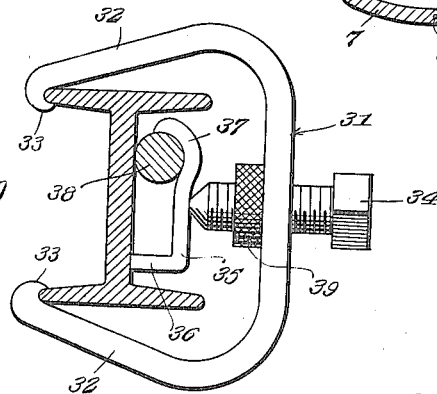
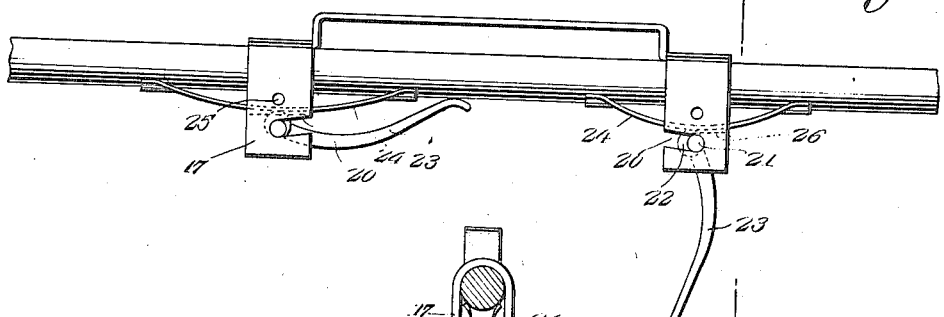
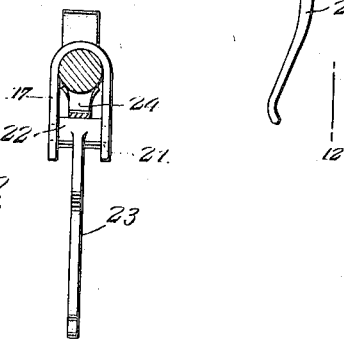
Witnesses
J. H. Crawford
Wm. T. Smith
Inventor
W. W. Hunt,
By Victor J. Evans
Attorney

UNITED STATES PATENT OFFICE.

WILLIAM W. HUNT, OF KANSAS CITY, MISSOURI.

STEERING DEVICE.

1,164,522.  Specification of Letters Patent.  Patented Dec. 14, 1915.

Application filed February 16, 1915. Serial No. 8,584.

*To all whom it may concern:*

Be it known that I, WILLIAM W. HUNT, a citizen of the United States, residing at Kansas City, in the county of Jackson and State of Missouri, have invented new and useful Improvements in Steering Devices, of which the following is a specification.

The present invention relates to new and useful improvements in a steering device for automobiles and the like.

One of the objects of the invention is to provide an adjustable center drive for automobiles, which will firm the same to impart thereto the same advantages as are found in machines that are equipped with the worm drive, and is designed to avoid the numerous accidents that are prevalent in driving the lighter cars, as well as to protect the occupants of the car in case of breakage or loss of some of the parts of the steering gear (as is often the case) by coursing the same straight until the driver is again in complete control of the car.

It is also my aim to provide such a device of the very simplest construction, free from complications, which will at all times insure durability, accuracy and efficiency of service, and which also will relieve the driver of the constant necessity of having his hand upon the steering wheel.

With the above and other objects in view the invention consists of a continuous spring, a clamp or clamps, and an attachment fastened to the steering rod for supporting the ends and sides of the spring and so maintain the front wheels of the car in a straight ahead direction.

In the drawings there are illustrated simple and satisfactory exemplifications of my improvement reduced to practice, but the nature of the invention is such that the same is susceptible to various changes, all of which, however, fall within the scope of my claims.

Figure 2:
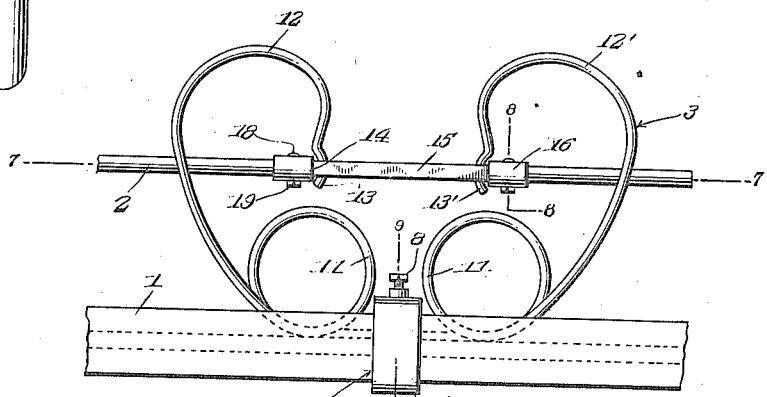
Figure 3:
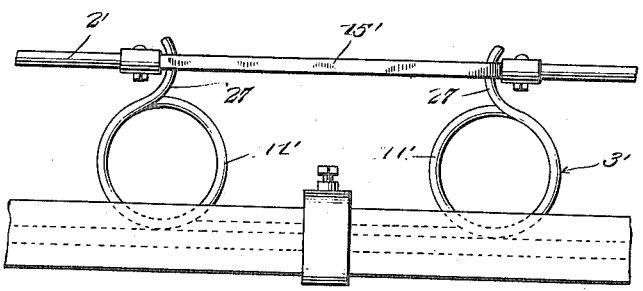
Figure 4:
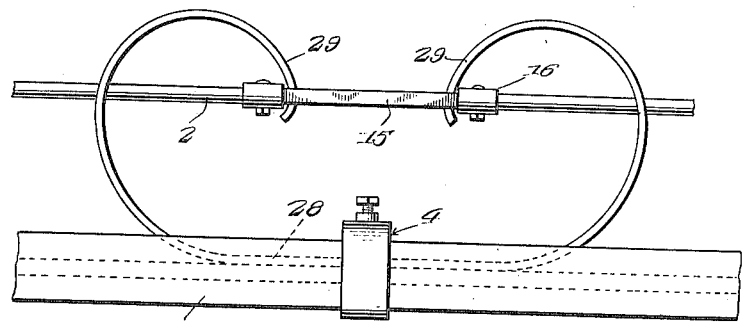
Figure 5:
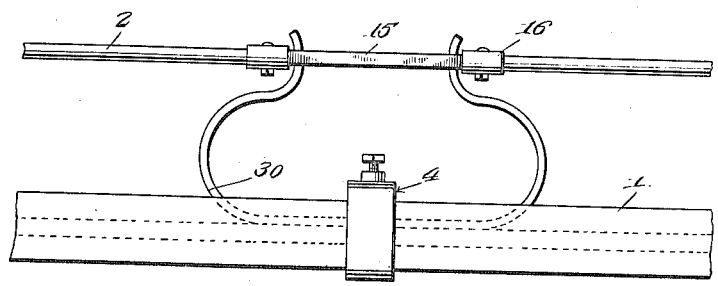
Figure 6:
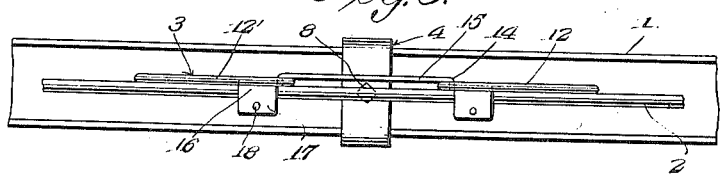
Figure 7:
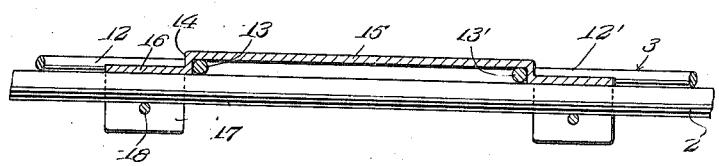

In the drawings: Figure 1 is a top plan view of a portion of the chassis of an automobile illustrating the improvement attached to the steering rod for the front wheels of the vehicle, Fig. 2 is a greatly enlarged top plan view of the same, the steering connecting rod as well as the front axle being broken away, Fig. 3 is a similar view illustrating a modification, Fig. 4 is a similar view illustrating a further modification, Fig. 5 is a similar view illustrating a still further modification, Fig. 6 is an end view looking toward the steering rod and toward the axle from the rear, Fig. 7 is a longitudinal sectional view on the line 7—7 of Fig. 2, Fig. 8 is a transverse sectional view on the line 8—8 of Fig. 2, Fig. 9 is a similar sectional view on the line 9—9 of Fig. 2, Fig. 10 is a sectional view similar to Fig. 9 but illustrating a modified form of axle clamp, Fig. 11 is a detail side elevation of a means for sustaining the clamp upon the steering rod for demonstrating purposes before the said clamp is permanently connected with the steering rod, and Fig. 12 is a sectional view on the line 12—12 of Fig. 11.

Referring now to the drawings in detail and to Figs. 1, 6, 7, 8 and 9 in particular, 1 designates an axle of a comparatively light car such as that of the Ford manufacture and 2 the steering rod for the wheels thereof, the said steering rod being arranged parallel with but to the rear of the axle and moving from right to left in a lateral direction as the steering wheel is operated by the driver. The numeral 3 designates an adjustable steel continuous coiled spring which is placed between the upper and lower flanges of the substantially angular beam providing the axle 1, at the back of said axle and the said spring is centrally held in by a clamp 4, clearly illustrated in Fig. 9 of the drawings. The clamp includes a body member having oppositely disposed arms, one being of a greater length than the other and the larger arm is provided with a lip 5 which is adapted to engage with one of the longitudinal edges of the channeled member comprising the axle 1. The second and shorter arm of the clamp has pivotally connected therewith, as at 6, the body of a hook 7, and this hook is adapted to engage with the opposite lower longitudinal edge of the second flange of the said axle 1.
The body of the clamp is centrally provided with a boss having a threaded opening through which passes a screw 8, the said screw bearing against a block 9 and the said block has its inner face formed with a round longitudinal depression or pocket 10 which receives the central portion of the spring 3 and forces the said spring within the channel against the inner face of the axle. The spring has convolutions 11 disposed each an equal distance from the center of said spring, and is provided with outwardly inclined and inwardly curved portions 12 and 12' which terminate in oppositely arranged rounded ends, or which, for the sake of convenience, may be referred to as lips designated by the numerals 13—13'. These lips are adapted to contact with the opposite end or offset portions 14 of a longitudinally extending horizontally disposed guide member 15 that is connected to the steering rod 2. The member 15 as well as its angular ends 14 are preferably formed from a strip of flat metal, and the said guide also includes outwardly extending longitudinally projecting portions parallel with the guide plate proper; that is, arranged at a right angle to the ends 14, and these portions, indicated by the numerals 16, are provided with laterally disposed clips 17—17, arranged in pairs, to straddle the opposite sides of the steering rod 2, the said clips being provided with openings for the reception of securing elements, such as bolts 18 and nuts 19. On coursing the car to the left, the steering rod is, of course, moved to the right, and thus, through the medium of a guide 15 expands the end 12' of the spring, releasing the end or lip 13 of the end 12 of the spring which glides along the steering rod and the horizontal guide member 15, until the steering rod is released by the driver at the steering wheel, at which time the spring end 12' being retractile as well as contractile assumes its natural position and with the assistance of the end 12 of said spring again retains the wheels of the car in a straight forward position. On coursing the car to the right, the same results are obtained only the opposite operation being necessary.

It is to be understood that the guide is constructed from a single piece of metal and by referring to Fig. 11 it will be noted that the clips 17 may be projected a suitable distance beyond its bolt openings and the said clips may be slotted laterally, as indicated by the numerals 20. The slots 20 are adapted to receive lateral members or trunnions 21 provided upon the heads 22 of a fulcrum lever 23, while bowed springs 24 are arranged between the lever and contact with the steering rod for the opposite edges of the clips. By swinging the lever to the position shown in full lines upon the left hand side of said Fig. 11, the cam head 22 is brought into contact with the central portion of the spring 24, thus effectively sustaining the guide upon the steering rod for demonstrating purposes. When the clamp is to remain a permanent fixture, the bolts 18 are inserted through the bolt openings 25 in the said clips, it being noted that the said openings are disposed adjacent one of the sides of the steering rod, and therefore out of the path of contact by the springs 24.

After the nuts 19 have been applied to the bolts 18, the cam lever is swung to the position illustrated upon the right hand side of said Fig. 11, and the springs are drawn laterally from between the clamps after which the trunnions 21 upon the heads 22 of the levers are moved laterally through the slots 20. The ends of the clips may then be cut upon the dotted lines 26 indicated upon the clips in the said Fig. 11.

In Fig. 3 of the drawings I have illustrated a spring 3' which is centrally secured to the axle through the medium of a clamp similar to that previously described. The spring at points equi-distant from its center is formed with loops 11' from which extend angularly disposed ends 27. The ends are not provided with the outwardly extending and curved portions, as illustrated in Figs. 1 and 2, but project directly and approximately centrally of the loops 11 and the said ends are preferably curved in opposite directions and contact with the opposite ends or lateral portions of the clamp 15' which is secured to the steering rod 2'.

In Fig. 4 I have illustrated a spring which may be employed with equal efficiency, the same providing a straight body portion 28 that has its sides rounded outwardly in opposite directions and its ends incurved, as at 29, the said incurved ends contacting with the opposite contact or lateral portions 14 of the guide 15, and the body of the spring 28 is centrally connected with the axle.

In Fig. 5 I have illustrated a spring 30 substantially similar to the spring shown in Fig. 3, except that the same is not provided with the convolutions 11', and this spring is attached to the axle and co-acts with the guide in a manner similar to that previously described.

In Fig. 10 I have illustrated a modified form of axle clamp, the same being indicated by the numeral 31 and comprising a body portion having oppositely inwardly extending angular arms 32—32, the ends of said arms being each formed with a lip 33, the said lips engaging with the opposite longitudinal edges of the flanged portions of the axle. The body is centrally provided with a threaded opening for the reception of a screw 34, the said screw bearing upon the central portion of a spring member 35. One end of the spring is provided with a lateral offset or finger 36 and the opposite end is rounded, as at 37, and engages with the central portion of one of the main springs, heretofore referred to. It will be noted that when the screw 34 is adjusted, to exert a pressure upon the member 35, the central portion of the same will be bent inwardly between its rounded portion 37 and its finger 36, so that the said rounded portion will effectively bind the body of the main spring, indicated in this figure by the numeral 38, and to prevent the accidental rotation of the screw 34 I provide the same with a binding nut 39.

I am aware of the fact that numerous devices for a similar purpose are already on the public market, each having the same idea in view; namely, of centering a vehicle or motor car, yet I claim that my invention accomplishes this result in an entirely different manner from other devices which have come under my observation, and having thus described the invention, what I claim is:

1. In a device for the purpose set forth, a vehicle axle comprising a channeled member, a steering rod for the wheels of the axle, a spring having its body portion arranged within one of the channeled sides of the axle, a clamp upon the axle, an adjustable member associated with the clamp and engaging with the spring to retain the same upon the axle, a longitudinally extending guide upon the steering rod, and the opposite side members of the said spring being received between the guide and the steering rod and contacting with the ends of said rod.

2. In a device for the purpose set forth, an axle comprising an I-beam, a steering rod arranged to the rear of the axle for guiding the wheels on said axle, a spring arranged within one of the channels of the I-beam axle, a clamp including a member having its ends hooked and engaging with the longitudinal edges of the axle, and a member between the clamp and the spring and engaging with the spring, and an adjustable member on the clamp and contacting with the spring engaging member to force the same against the said spring, the spring having sides terminating in ends, a longitudinally extending guide member upon the steering rod, the curved ends of the said spring being arranged within and contacting with the opposite ends of said guide member.

3. In a device for the purpose set forth, an axle and a steering rod for the wheels of the axle, the spring member comprising a finger element having its central portion connected to the center of the axle, a guide member upon the steering rod, said member comprising a flat plate having offset ends and its said ends formed with clips, and means passing through the clips for securing the guide member upon the steering rod, the spring having side curved portions which terminate in rounded ends providing lips, and the said lips being received between the guide member and the steering rod and contacting with the offset ends of said steering rod.

4. In combination, an axle, a steering rod for the wheels of the axle, a flat spring secured to the axle, a guide member upon the steering rod receiving the ends of said spring and being contacted by the said ends of the spring, said guide having laterally extending clips which overlie the opposite sides of the steering rod and project therebeyond, the said clips having openings for securing members and being provided with slots disposed beyond the said bolt openings, a cam lever having its head formed with trunnions and arranged within the slots, spring members passing between the clips and the said spring members adapted to be contacted by the cam head of the levers to force the ends of the same into engagement with the steering rod.

5. The combination, an axle, a steering bar arranged parallel with the axle and connected with the wheels of said axle, a spring having its body portion arranged upon the axle, a clamp comprising a substantially U-shaped member having inturned angular sides which terminate in hooks that engage with the opposite corners of the axle, an adjustable element passing centrally through the body of said member, a compressible element contacting the spring and engaged by the adjustable member, a guide upon the steering rod, the ends of said spring adapted to be received within the guide and contact with the ends of said guide.

In testimony whereof I affix my signature in presence of two witnesses.

WILLIAM W. HUNT.

Witnesses:
JAMES P. SCANLON,
BERTHA E. JEFFORDS.